United States Patent [19]

Foerster

[11] 4,139,867

[45] Feb. 13, 1979

[54] METHOD FOR FAST- AND SLOW-MOTION REPRODUCTION OF VIDEO SIGNALS STORED IN A SUCCESSION OF PARALLEL TRACKS ON A RECORD MEDIUM

[75] Inventor: Hubert Foerster, Darmstadt, Fed. Rep. of Germany

[73] Assignee: Robert Bosch GmbH, Stuttgart, Fed. Rep. of Germany

[21] Appl. No.: 833,993

[22] Filed: Sep. 16, 1977

[30] Foreign Application Priority Data

Sep. 18, 1976 [DE] Fed. Rep. of Germany ....... 2642019

[51] Int. Cl.² ........................... G11B 5/78; H04N 5/78
[52] U.S. Cl. ......................................... 360/10; 358/4; 360/9; 360/24
[58] Field of Search .................... 360/10, 22, 8–9, 360/14, 24, 33, 35–36; 358/4, 12

[56] References Cited

U.S. PATENT DOCUMENTS

| | | | |
|---|---|---|---|
| 3,395,248 | 7/1968 | Suzuki et al. | 360/10 |
| 3,662,101 | 5/1972 | Segerstrom | 360/10 |
| 3,699,247 | 10/1972 | Mashima | 360/10 |
| 4,045,819 | 8/1977 | Goldmark | 360/10 |
| 4,063,290 | 12/1977 | Metildi | 360/24 |

Primary Examiner—Alfred H. Eddleman
Attorney, Agent, or Firm—Flynn & Frishauf

[57] ABSTRACT

In order to provide fast- and slow-motion reproduction of video signals a tape is played back at a different velocity, at which the scan traces provide acceptable signals for only a portion of each track at a time, the acceptably picked-up picture lines of these track portions are temporarily stored (others being excluded) and then played back under conditions satisfying television reception standards, in an order determined by an address made up of the line number and a track and field identification provided in response to track and field beginning pulses recorded on the tape. The address can be recorded together with the video signals or can be generated by counting means during the reproduction of the video signals. The tape transport speed is automatically adjusted slightly, if necessary, with respect to the speed setting, to avoid duplicate storage of corresponding lines in successive fields at the expense of omission of other lines. Where it is satisfactory to limit the slow-motion and fast-motion tape speed to a number of particular values, the temporary storage and playback can be controlled by a read-only memory that has its content selected by the tape speed setting.

8 Claims, 5 Drawing Figures

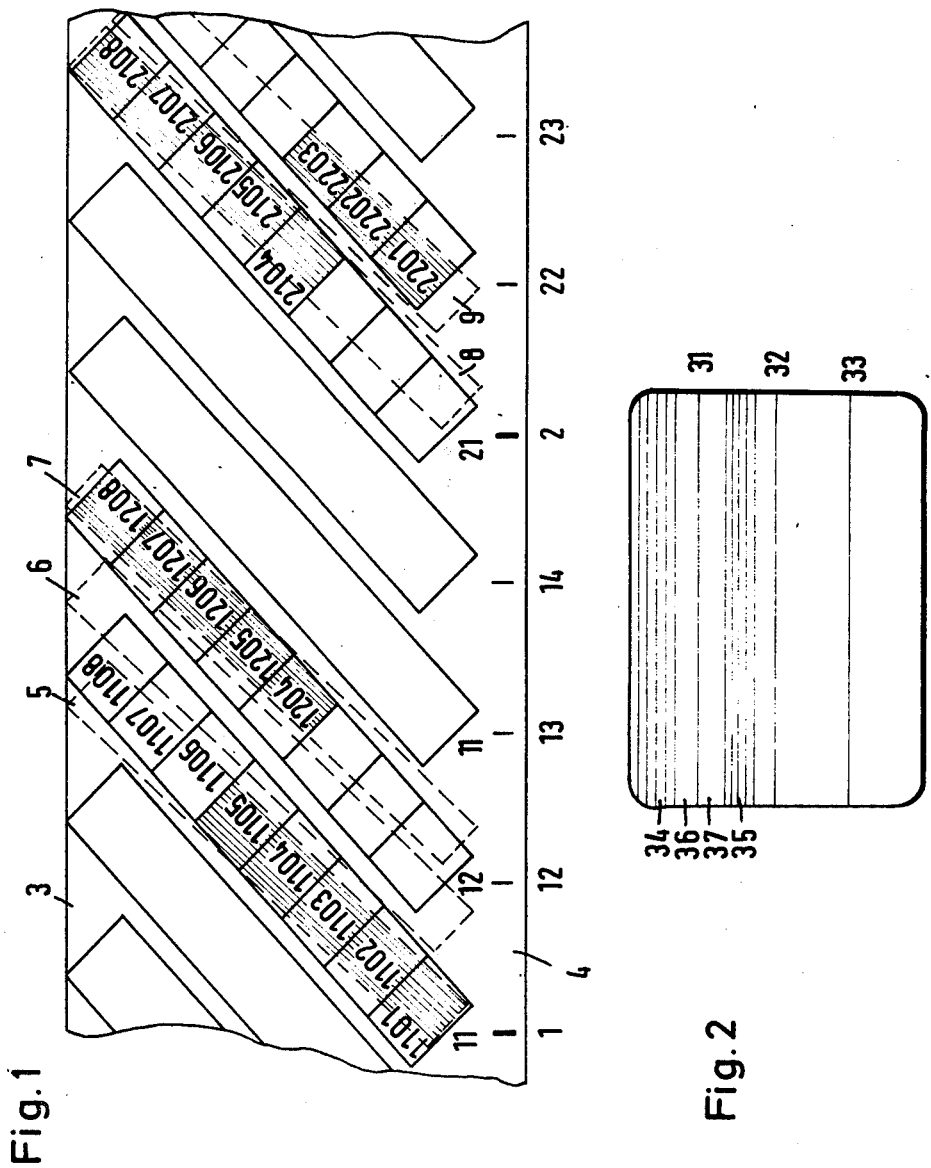

METHOD FOR FAST- AND SLOW-MOTION REPRODUCTION OF VIDEO SIGNALS STORED IN A SUCCESSION OF PARALLEL TRACKS ON A RECORD MEDIUM

This invention relates to the playback of tape recorded television signals, and more particularly to a method of playing back a television signal, which was recorded in a set of parallel tracks set obliquely across a magnetic record tape, with a playback tape transport speed that is different from, most usefully slower, than the tape transport speed used for recording.

It is common in a magnetic video recorder to record television signals in a series of separate tracks set at an angle to the longitudinal direction of the magnetic tape that depends upon the conditions chosen for the particular recording process. If it should be desired to reproduce signals so recorded while adhering to the television standard conditions of the recorded signal, it necessarily results that the changed transport velocity of the tape prevents the path described by the reproducing head or heads (which may be called the scanning traces) from "tracking" with the recorded tracks.

In recording methods in which in every case a half-picture, which is to say a first field of an interlaced two-field picture, is recorded on a single track, this deviation of the scanning trace from the recorded track can be compensated by a suitable automatic control of the magnetic head. In the case of recording methods in which each field is spread over, and hence subdivided into a number of tracks, such compensation is not possible, because the neighboring track has an entirely different picture content.

It is an object of the present invention to provide a method of playing back recordings in which a picture field is recorded in a plurality of parallel tracks on the tape at a playback tape transport speed differing significantly from the tape transport speed used for recording.

SUMMARY OF THE INVENTION

Briefly, the television signals picked up are temporarily stored so long as they meet at least one predetermined requirement, which is preferably a minimum amplitude requirement, the minimum amplitude requirement being applied to the carrier wave in the case of a frequency modulated picture signal. There is also stored a picture address with the stored signals so that the position of the picture lines in question in the picture field will be identified, which is important because the minimum amplitude requirement is not continuously met. The stored signals are then read out of storage in such a way that the output corresponds to the desired television standard, in line scanning frequency and so on. Keeping track of the picture location of each continuous string of lines temporarily stored can be done very simply for particular speed ratios by putting them into storage in accordance with a pattern depending upon the particular selected ratio of the playback tape transport speed to the recording tape transport speed. In a more general case, however, the addressing can be done more explicitly, preferably by forming the address digitally as a number of which one part is a number identifying the field, another is a number identifying the particular track making up the field and still another part is a number representing the particular line within a track. With such addressing, the playback method can be refined so that the tape transport speed originally set on a continuously variable control is modified whenever lines with the same picture address are temporarily stored in successive fields, just enough to avoid such duplication.

The playback method of the present invention has the great advantage that even in the case of video tape records in which a field is recorded in a number of tracks, it is still possible to provide slow motion and fast motion reproduction of the recorded pictures.

The invention is further described by way of illustrative embodiments with reference to the annexed drawings, in which:

FIG. 1 is a diagram showing an array of record tracks and playback traces corresponding to the playback method of the present invention;

FIG. 2 is a diagram of the composition of a television picture played back according to the method of the present invention;

Figure 3:
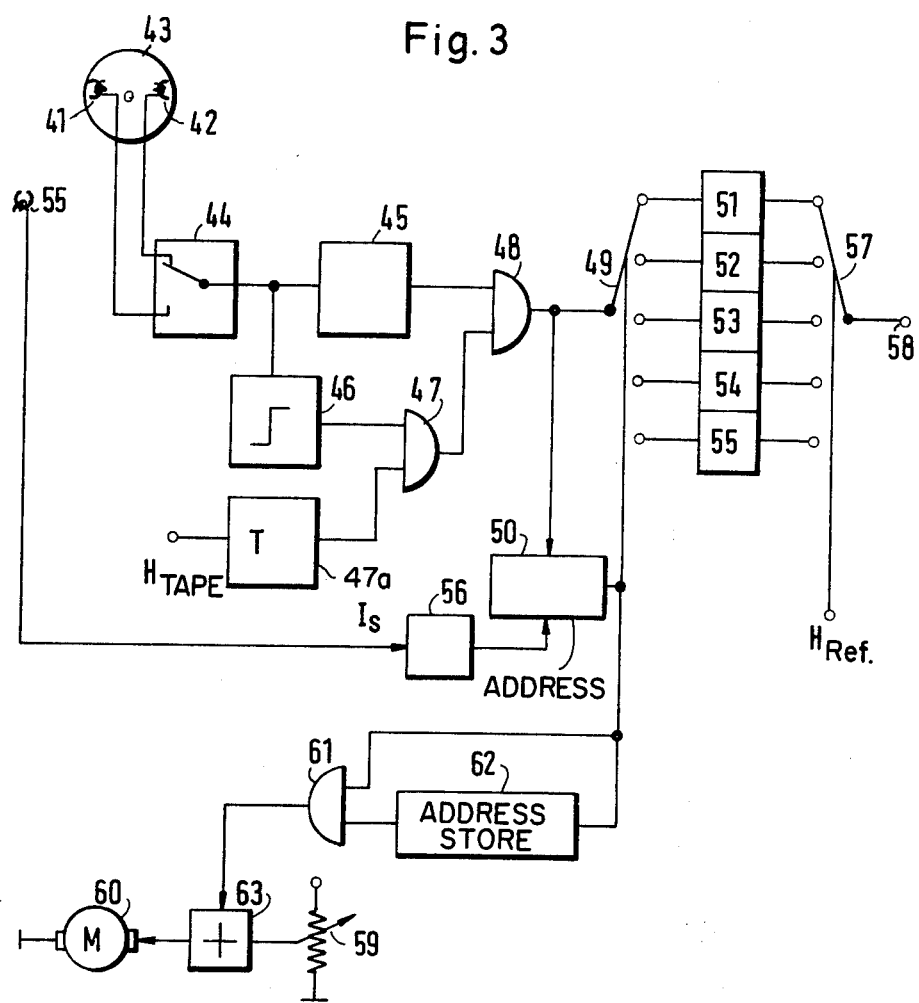
FIG. 3 is a circuit diagram for carrying out the method of the present invention.

FIG. 1 shows a section of magnetic tape 3 on which signals are recorded according to the helical scan method that produces oblique parallel tracks on the tape. For reasons of clearer presentation, the angle between the tracks and the longitudinal direction of the tape is enlarged compared with the method as applied in practice and the width of the tracks is strongly exaggerated in the representation.

In addition to the oblique tracks, there is also shown a longitudinal track, the so-called control track, by means of which the necessary relation between tape transport speed and headwheel rotation is maintained. In the illustrated example, a pulse is recorded on the longitudinal track for identification of the beginning of each of the other tracks. At the beginning of those tracks which contain the beginning of a field, a pulse distinct from the other pulses is recorded on the longitudinal track. Such pulses are designated with the reference numerals 1 and 2 in FIG. 1, while the control pulses lying between them are designated 12, 13, 14 for one field and 22 and 23 for a portion of the next.

In the described example, there are eight lines recorded in each track, that are likewise numbered, so that each line has an address on the tape that is made up of the number of the field, the number of the track within the field and the number of the line within the track.

The television signal recorded according to the example thus has 32 lines per field. Commonly, there are provided still more longitudinal tracks on television magnetic recording tapes, for the accompanying sound, among other things. These additional tracks are not shown in the drawings in order to simplify the illustration.

If now a different transport speed is set for playback while maintaining the rotary speed of the head wheel, the traces 5, 6, 7, 8 and 9 shown in broken lines in FIG. 1 are scanned by the playback head. The steeper inclination of the traces scanned by the playback head is caused by the lower tape speed. This circumstance also results in the creation of more scan traces than recorded tracks for a given tape length. Thus the scan trace 5 gradually leaves the recorded track 11, so that the lines 1101 to 1105 or 1106, according to surrounding circumstances, can be played back. For the present example, it will be assumed that the line 1105 still provides satisfactory signals. These signals are stored, as explained more fully below in connection with FIG. 3 and FIG. 5. The lines still lacking of the first track 11 of the first field 1 will be obtained by the scanning of record track 21, namely the first track of the second field, at which time a sufficiently good tracking by the scanning trace will occur, under the assumptions of the present example, for pickup of the lines 2104 to 2108.

The trace 6 described by the magnetic head on playback does not deliver any satisfactory signals at all, whereas the scan trace 7, by tracking approximately with the record track 12 during the passage of the lines 1204 to 1208, delivers signals from these lines that are temporarily stored.

FIG. 2 is a diagram of a television picture as it is temporarily stored, for example after scanning over the first field on the tape. The limits of the picture sections that correspond to the individual scan traces are indicated by the lines 31, 32 and 33. The lines 34 and 35 designate the television lines that are stored by pickup of the first field, thus the lines 1101 to 1105 in one case and 1204 to 1208 in the other. In the positions 36 and 37 that are still blank in FIG. 2, there will be inserted the lines 2106 to 2108 and 2201 to 2203 during the second field.

Since the lines 2104 and 2105 provide adequate signals according to the representation in FIG. 1, they will replace the already stored lines 1104 and 1105. Although in the above description of the present invention there is mention of half-picture fields, this does not mean that the method is limited to the storage of signals by half-picture fields, hence to treating the lines 1101 and 2101 as lying in the same position. Within the scope of the invention, it is entirely possible to store the signals of a full picture. In general, however, it is generally sought, to compose all the signals of a television picture out of as few fields or full pictures as possible in the practice of the present invention, in order to minimize any motion distortion produced in the process.

FIG. 3 is a block diagram of the circuit of equipment for carrying out the method of the invention. The signals produced in the two magnetic heads 41 and 42 that are mounted on a headwheel 43 are supplied to a head transfer switch 44 that is put in its upper position during one scan trace and in the lower position during the next, and so on. The reproduced signals that have the frequency modulation usual to video recording are processed by a demodulator 45. The carrier frequency signals are supplied, besides to the demodulator, also to a threshold switch 46. The threshold switch 46 provides a signal when the carrier frequency signals exceed a predetermined amplitude, hence whenever the reproducing head tracks the record track sufficiently well. In order that this signal should not begin or stop within a line frequency period, but only at the beginning or ending of lines, the signal is also coupled in a circuit 47 to which an H pulse (line-synchronizing pulse) picked up a magnetic tape is also supplied.

In the circuit 48, the signal thus produced is so correlated with the demodulated video signals that only those video signals of lines for which the carrier frequency amplitude is greater than a predetermined value reach the selector switch 49.

The selector switch 49 is controlled in such a way that the signals of respective lines are read into the stores 51, 52, 53, 54 and 55 in accordance with their address. For simplification of the illustration, only five stores are shown, but of course such a store is necessary for each line of of a field or picture in the temporary memory. In accordance with contemporary signal storage technology, digitally operating stores with associated conversion of the signals into digital form can be advantageously used.

The address of each line is provided in the embodiment illustrated in FIG. 3 in such a way that the number of every line is recorded already within a track at the time of recording, for example in the horizontal blanking period (H gap), so that the corresponding signal portions can be separated and supplied to the circuit 50. The first two numbers (for example bcd digits) of the address, namely the field and track numbers, however, are produced on playback by counting at a counter 56 of the control pulses $I_s$ produced by the control track pickup head 55.

The reading out of the signals from the stores is produced by the selector switch 57 that is controlled by line-synchronous pulses $H_{REF}$, so that television signals in accordance with television reception standards are available at the output 58 which are free of time errors but moreover, could have resulted from the different rhythms of recording and reproduction. The setting of the tape transport velocity is produced by a setting device 59 that is connected to the capstan motor 60. Although only a simple voltage-setting potentiometer is shown, it symbolizes more sophisticated circuits that are well known in considerable variety, all delivering a control voltage, and therefore not further described or shown.

If the value set for the tape speed should produce the result that the same lines are readable in successive fields and therefore should fail to fill these collection of stores in the temporary memory, an error signal will be produced by comparison of the addresses of the lines stored in two successive fields, by means of the circuits 61 and 62, and the error voltage will be supplied to the adding circuit 63 for modification of the control voltage for the tape speed, so that the tape speed will be slightly modified to avoid the duplication of some lines at the expense of omitting others.

Figure 4:
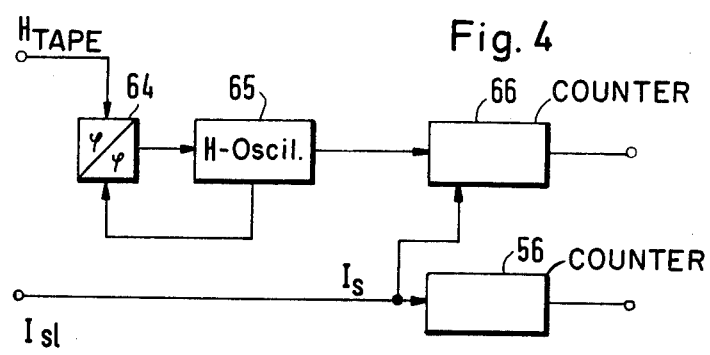
FIG. 4 is a modification of a portion of the circuit of FIG. 3.

FIG. 4 shows another circuit for generation of the addresses. In this case, the address of the track for a circuit like FIG. 3 is obtained by counting of the control pulses $I_s$, while the address of the lines is derived by counting horizontal scan frequency pulses. Since horizontal scan frequency pulses are not continuously obtainable from the magnetic tape, these are regenerated by what may be regarded as a flywheel circuit consisting of an oscillator 65 and a phase comparison circuit 64, and then supplied to the counter 66.

Figure 5:
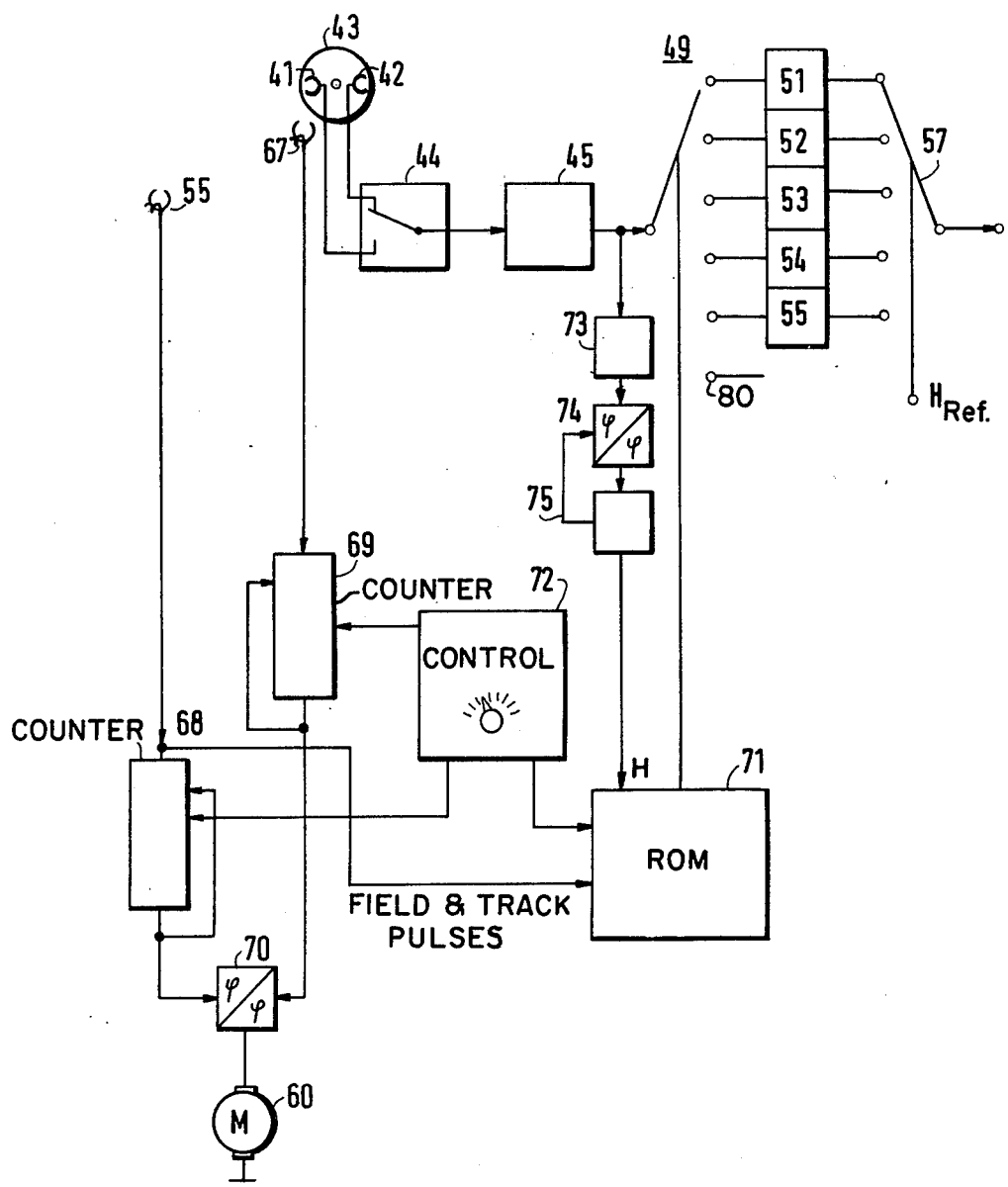
FIG. 5 is another circuit diagram for carrying out the playback method of the present invention.

As in the circuit of FIG. 3, in the circuit of FIG. 5 the signals generated by the magnetic heads 41 and 42 are supplied over the transfer switch 44 and the demodulator 45 to the transfer switch 49. The storing of the signals follows in the same way as in the case of FIG. 3, and likewise their reading out. Only the ordering of the signals in the stores according to their addresses is produced in a different way, which in the case of the circuit of FIG. 5 is based on the basis that the tape transport velocity for reproduction at speeds other than the recording speed always stands at some predetermined ratio to the recording speed. For this purpose, pulses produced by the control track head and by a magnetic head 67 provided on a headwheel are respectively counted by the counters 68 and 69. These counters are automatically reset upon reaching a predetermined count, at which time a pulse is provided to a phase comparison circuit 70. According to whether the pulse from the counter 68 leads or lags, the capstan motor 60 is braked or accelerated.

In a read-only memory 71, there are stored for a number of selectable transport speeds the addresses of those lines that are usable for reproduction. These addresses are supplied to the selector switch 49 in accordance with the transport velocity set by the control device 72.

In the arrangement according to FIG. 5, there is not interruption of the signal flow provided between the demodulator 45 and the selector switch 49. Instead, under control of the ROM 71, the switch 49 is put on a contact 80 not connected to any store during line periods of poor reproduction. Part of the address information in the ROM may be used to control the location at which lines are stored in the temporary memory 51, 52, 53, . . . in order to simplify the operation of the switch 57 in reproducing the lines in a sequence corresponding to their addresses. The control circuit 72 is merely a tape speed selecting device controlled by a suitable multi-position switch. It controls the speed by setting the ratio of the number of turns of the headwheel, which operates at a constant speed, to the number of track pulses picked up on the control track. At the same time, it furnishes a signal $I_s$ that instructs the ROM how it must respond to the field and track pulses provided from the head 55 and to the line pulses (H) provided by the oscillator 75 in supplying addresses for control of the switch 49 which, as will presently be mentioned, generally, rather than a mechanical selector switch, is a collection of addressing circuits of a random access memory.

The oscillator circuit 75 is necessary because line synchronization pulses are not received for every line from the demodulator 45. These horizontal scan frequency pulses are generated under a known synchronizing method by means of a separator 3 that separates the line-synchronizing pulses that are adequately received and furnishes them to a phase comparison circuit 74 which continuously corrects the frequency of the oscillator 75, which operates as a "flywheel" and continually furnishes correctly timed line-synchronizing pulses to the ROM 71.

As mentioned before, in both FIGS. 3 and 5, the selector switches 49 and 57 are only shown in mechanical switch representation for purposes of ready comprehension. There are of course a wide variety of means available in the electronics art for associative switching and corresponding synchronized control for repartition of signals among various store units. In general it should be said that the stores 51, 52, 53, . . . of FIGS. 3 and 5 are essentially store locations or "word" locations of a random access memory having a memory matrix, address buffers, address decoders and controlled by a "write and sense amplifier" through which data is written in and read out. An illustrative description of such a random access memory, operate of course by virtue of semiconductor devices organized on integrated circuit units, is given at pp. S284–S286 of the 1974 supplement to the TTL Data Book published by Texas Instruments, Incorporated, describing 64-bit random access memories of types SN54S289 and SN74S289, but of course for television signal line storage, a random access memory with a larger bit capacity is necessary, these being made available from a number of manufacturers on a commercial basis. Commercially available memories of this type provide storage on a digital basis and of course this means that ahead of the switch 49, an analog-to-digital converter would be used, as is well understood, and that following the output of the switch 57, a digital-to-analog converter would be used. Such converters are also well known and commercially available and the selection of particular models depends upon the number of bits which it is desired to use to encode each of a succession of amplitude samples, this being a question of the amplitude variation resolution desired for the signals.

The circuit 47a which processes line-synchronizing pulses for printing the gate 47 through which signals must pass in order to be temporarily stored, of course as an input derived from a synchronizing pulse separator of conventional type interposed in the amplification path of reproduced signals and not shown in order not to complicate the illustration of FIG. 3. The synchronizing pulses are used to trigger a timing circuit, such as a monostable multivibrator, which has a duration corresponding to the period during which the signals of a recorded line are reproduced, and the pulse produced by the timing circuit is furnished to the gate 47. The triggering of the timing circuit is bias so that only line-synchronizing pulses of a predetermined amplitude will trigger the timing circuit. If no line-synchronizing pulse is reproduced or only a very weak one, the timing circuit will not operate and even if the circuit 45 shows the beginning of an adequately strong carrier wave after the line has begun, no enabling signal will be passed by the gate 47 to the gate 48. On the other hand if an adequate line-synchronizing signal is picked up, the gate 47 will be opened for the line duration and any part of the line signals having an adequate carrier amplitude will result in an enabling signal being passed by the gate 47 to the gate 48.

I claim:

1. A method of playing back television picture signals, recorded in a series of parallel tracks on magnetic tape, in selectively slowed or accelerated picture motion, comprising the steps of:

operating a television tape record playback device at a tape transport velocity different from the velocity of tape transport used for recording the television signals recorded thereon while operating the playback heads of said device at the same angle of scan used by said device for playback at the velocity of tape transport used for recording;

temporarily storing only those signals that are picked up by the rotary heads from said track portions which signals meet at least one predetermined requirement;

temporarily storing, together with the signals meeting said predetermined requirement, relating to a consecutive set of recorded television lines, a picture address for said set of recorded television lines, and reading out said temporarily stored signals under playback conditions in accordance with a television signal standard in a sequence corresponding to the picture addresses temporarily stored with said signals.

2. A method as defined in claim 1, in which said predetermined requirement by which signals are selected for temporary storing in the temporary storing step is a minimum signal amplitude.

3. A method as defined in claim 2, in which said predetermined requirement is a minimum carrier wave amplitude of a frequency modulated carrier wave constituting a portion of said signals.

4. A method as defined in claim 1, in which the step of storing a picture address is performed by constituting the address out of a number designating a half-picture, a number designating the record track among the record tracks recording said half-picture and a number designating the line within a recorded track for each line that is temporarily stored.

5. A method as defined in claim 1, which also includes the step of recording, near the record of every television line, the number relating to the sequence of said line record in the track in which it is recorded, and in which the step of storing an address includes the substeps of:

counting cyclically the recorded fields on said magnetic tape by counting recorded pulses designating the beginning of each field;

counting cyclically the tracks of each field by counting recorded pulses designating the beginning of each track, reading the line number recorded to identify each line within a track, and temporarily storing with each line the current field and track count and said line number as an address for said line.

6. A method as defined in claim 5, in which there are included the further steps of:

detecting when in successive half-pictures a line having otherwise the same address is temporarily stored, and in response to detection of such temporary storage of corresponding lines in successive half-pictures, varying the tape transport velocity just enough to avoid such temporary storage and detection.

7. A method of playing back television picture signals, recorded in a series of parallel tracks on magnetic tape, in selectively slowed or accelerated picture motion, comprising the steps of:

operating a television tape record playback device at a tape transport velocity different from the velocity of tape transport used for recording the television signals recorded thereon while operating the playback heads of said device at the same angle of scan used by said device for playback at the velocity of tape transport used for recording;

controlling the tape transport speed at one of a predetermined set of transport speeds;

providing a read-only memory of the lines of each track in a field sequence that are capable of being adequately reproduced in successive scan traces at each of said playback tape velocities with reference to a recording tape velocity;

temporarily storing, under control of said read-only memory, the signals corresponding to said lines identified by said read-only memory;

providing address information for said lines by said read-only memory;

reading out said temporarily stored signals under playback conditions in accordance with a television signal standard in a sequence determined by address information provided by said read-only memory.

8. A method as defined in claim 7, in which the step of controlling said tape transport speed includes setting a relation between playback head revolution rate and tape transport speed, maintaining said ratio by comparing said rate and speed to generate an error signal and correcting tape transport speed to reduce said error signal.

* * * * *